United States Patent
Peytavy et al.

(10) Patent No.: US 6,290,754 B1
(45) Date of Patent: Sep. 18, 2001

(54) REGENERATIVE PROCESS FOR THE DEACIDIFICATION OF A GAS CONTAINING $CO_2$ AND LIQUID HYDROCARBONS USING AN ABSORBENT LIQUID BASED ON ACTIVATED METHYLDIETHANOLAMINE

(75) Inventors: Jean-Louis Peytavy, Lescar; Serge Capdeville, Poey de Lescar; Herve Lacamoire, Arbus, all of (FR)

(73) Assignee: Elf Exploration Production (FR)

( * ) Notice: Subject to any disclaimer, the term of this patent is extended or adjusted under 35 U.S.C. 154(b) by 0 days.

(21) Appl. No.: 09/467,866

(22) Filed: Dec. 20, 1999

Related U.S. Application Data

(63) Continuation of application No. PCT/FR99/00922, filed on Apr. 20, 1999.

(30) Foreign Application Priority Data

Apr. 22, 1998 (FR) .................................................. 98 05035

(51) Int. Cl.$^7$ .................................................. B01D 53/14
(52) U.S. Cl. .............................. 95/172; 95/174; 95/183; 95/235; 95/236; 423/228
(58) Field of Search ............................ 95/160, 162, 163, 95/165, 166, 168, 169, 172, 173, 174, 175, 177, 183, 191, 192, 193, 194, 236, 235; 423/228, 229

(56) References Cited

U.S. PATENT DOCUMENTS

| | | | |
|---|---|---|---|
| 3,463,603 | * 8/1969 | Freitas et al. ............................ | 95/236 |
| 3,502,428 | * 3/1970 | Gelbein et al. .......................... | 95/236 |
| 3,653,810 | * 4/1972 | Bratzier et al. ......................... | 95/174 |
| 4,100,257 | * 7/1978 | Sartori et al. ........................... | 95/236 |
| 4,336,233 | * 6/1982 | Appl et al. .............................. | 95/177 |
| 4,551,158 | * 11/1985 | Wagner et al. ......................... | 95/236 |
| 4,553,984 | * 11/1985 | Volkamer et al. ...................... | 95/236 |
| 4,618,481 | * 10/1986 | Heinzelmann et al. .............. | 423/288 |
| 4,696,803 | * 9/1987 | Nieh ...................................... | 95/236 |
| 4,749,555 | * 6/1988 | Bush ..................................... | 423/228 |
| 4,853,012 | * 8/1989 | Batteux et al. ........................ | 95/177 |
| 5,209,914 | * 5/1993 | Peytavy et al. ....................... | 423/228 |
| 5,273,679 | * 12/1993 | Hihara et al. .......................... | 95/177 |
| 5,277,885 | * 1/1994 | Peytavy et al. ....................... | 423/228 |
| 5,348,714 | * 9/1994 | Peytavy et al. ....................... | 423/228 |
| 5,462,721 | * 10/1995 | Pounds et al. ........................ | 423/226 |
| 5,861,051 | * 1/1999 | Critchfield et al. ................... | 95/236 |
| 5,904,908 | * 5/1999 | Suzuki et al. ......................... | 95/236 |
| 6,165,432 | * 12/2000 | Rooney ................................ | 423/228 |

* cited by examiner

*Primary Examiner*—Duane S. Smith
(74) *Attorney, Agent, or Firm*—Schnader Harrison Segal & Lewis LLP

(57) ABSTRACT

A regenerative process for deacidification of a gas containing $CO_2$ and liquid hydrocarbons including contacting the gas to be treated, in an absorption zone, with an absorbent liquid including methyldiethanolamine (MDEA) and an accelerator of absorption of $CO_2$ by the amine, thereby producing a treated gas with reduced $CO_2$ content and an absorbent liquid loaded with $CO_2$, subjecting the loaded absorbent liquid to a regeneration treatment to release $CO_2$ which it has bound, to produce 1) at least one acid gas fraction rich in $CO_2$ and 2) at least one regenerated absorbent liquid; and recycling into the absorption zone the at least one regenerated absorbent liquid, wherein the overall liquid hydrocarbon content in the gas to be deacidified containing $CO_2$ is greater than 14 liters of liquid hydrocarbons per million standard cubic meters of gas, and the activator combined with methyldiethanolamine in the absorbent liquid brought into contact with the gas containing $CO_2$ and liquid hydrocarbons consists of at least one compound of formula $H_2N-C_nH_{2n}-NH-CH_2-CH_2OH$ in which n represents an integer ranging from 1 to 4.

22 Claims, No Drawings

REGENERATIVE PROCESS FOR THE DEACIDIFICATION OF A GAS CONTAINING $CO_2$ AND LIQUID HYDROCARBONS USING AN ABSORBENT LIQUID BASED ON ACTIVATED METHYLDIETHANOLAMINE

This application is a continuation of International Application No. PCT/FR99/00922, filed Apr. 20, 1999, which claims priority to French Application No.98 05035, filed Apr. 22, 1998.

FIELD OF THE INVENTION

The invention relates to a regenerative process for the deacidification of a gas containing $CO_2$ and liquid hydrocarbons, using an absorbent liquid based on activated methyldiethanolamine.

BACKGROUND OF THE INVENTION

WO-A-8911327 describes a regenerative process for the deacidification of a gas containing $CO_2$ and possibly other acid gas compounds such as $H_2S$, using an absorbent liquid based on activated methyldiethanolamine (MDEA), that is to say an absorbent liquid consisting of an aqueous solution of MDEA and an activator of the absorption of $CO_2$ by MDEA. This process of deacidification, that is to say of removing $CO_2$ and other possible acid gas compounds contained in the gas, includes an absorption step, in which the gas to be deacidified is brought into contact with the absorbent liquid, in an absorption zone, in order to produce a treated gas with reduced $CO_2$ content and an absorbent liquid loaded with $CO_2$, and a regeneration step, in which the absorbent liquid loaded with $CO_2$ is subjected to a regeneration treatment, in particular by pressure reduction, in order to release the $CO_2$, and to produce, on the one hand, at least one acid gas fraction rich in $CO_2$ and, on the other hand, at least one regenerated absorbent liquid, that is to say with reduced $CO_2$ content, which is recycled into the absorption zone.

The activator combined with MDEA in the absorbent liquid may be selected from:

i) polyalkylenepolyamines, in particular diethylenetriamine, triethylenetetraamine, tetraethylenepentaamine and dipropylenetriamine, ii) alkylenediamines and cycloalkylenediamines, in particular hexamethylenediamine, aminoethylethanolmine, dimethylaminopropylamine and 1,2-diaminocyclohexane, iii) aminoalkyl derivatives of heterocycles such as piperazine, piperidine, furan, tetrahydrofuran, thiophene and tetrahydrothiophene, in particular aminoethylpiperazine, aminopropylpiperazine, aminoethylpiperidine, aminopropylpiperidine and furfurylamine, iv) alkoxyalkylamines, in particular methoxypropylamine and ethoxypropylaminee, and v) alkylmonoalkanolamines, in particular ethylmonoethanolamine and butylmonoethanolamine.

As is apparent emerges from the information provided by the examples in WO '327, the aforementioned activators, employed in the treatment of removing the $CO_2$ contained in a gas such as methane using an absorbent liquid based on activated MDEA, have substantially equivalent effectiveness with regard to accelerating the absorption of $CO_2$ by MDEA.

The gases containing $CO_2$, and in particular the natural gases containing $CO_2$, which are subjected industrially to the deacidification treatment using an absorbent liquid based on activated MDEA, may contain liquid hydrocarbons in varying overall concentration. It is in practice considered that a gas to be treated containing $CO_2$ is substantially free of hydrocarbons if the overall level of these products which it contains is less than a threshold representing 14 liters of liquid hydrocarbon per million standard cubic meters of gas.

The applicants observed that the presence of liquid hydrocarbons, in an overall amount greater than the above-mentioned threshold, in a gas to be deacidified containing $CO_2$ would greatly impair the action of the aforementioned activators on the absorption of the $CO_2$ by MDEA, and have found that the activators consisting of lower aminoalkylethanolamines such as aminoethylethanolamine would lead, when the gas containing $CO_2$ to be deacidified contains liquid hydrocarbons, to absorption of $CO_2$ by MDEA greater by about 15% to 20% than the absorption obtained under comparable conditions in the presence of the other activators proposed in the cited document WO '327.

SUMMARY OF THE INVENTION

The invention therefore relates to a regenerative process for the deacidification of a gas containing $CO_2$ and liquid hydrocarbons, of the type including an absorption step, in which the gas to be treated is brought into contact, in an absorption zone, with an absorbent liquid based on methyldiethanolamine (MDEA) and an accelerator of the absorption of $CO_2$ by the amine, in order to produce a treated gas with reduced $CO_2$ content and an absorbent liquid loaded with $CO_2$, and a regeneration step, in which the loaded absorbent liquid is subjected to a regeneration treatment in order to release the $CO_2$ which it has bound, and to produce, on the one hand, at least one acid gas fraction rich in $CO_2$ and, on the other hand, at least one regenerated absorbent liquid which is recycled into the absorption zone, the process being characterized in that the overall liquid hydrocarbon content in the gas to be deacidified containing $CO_2$ is greater than 14 liters of liquid hydrocarbons per million standard cubic meters of gas, and in that the activator combined with methyldiethanolamine in the absorbent liquid brought into contact with the gas containing $CO_2$ and liquid hydrocarbons consists of at least one compound of formula $H_2N-C_nH_{2n}-NH-CH_2-CH_2OH$ in which n represents an integer ranging from 1 to 4.

In particular, the activator combined with MDEA is selected from the compounds of formula $H_2N-(CH_2)_p-NH-CH_2-CH_2OH$, in which p is an integer equal to 2, 3 or 4, the said activator consisting quite especially of the aminoethylethanolamine compound of formula $H_2N-CH_2-CH_2-NH-CH_2-CH_2OH$.

The absorbent liquid is advantageously in the form of an aqueous solution of MDEA and the activator. If appropriate, the aqueous solution may furthermore contain a minor amount of one or more organic solvents of $CO_2$ which are soluble in water, in particular sulpholane, methanol or N-methylpyrrolidone.

The concentration of MDEA in the absorbent liquid may be between 1N and 6N, and is preferably from 2.5N to 5N.

The amount of activator which is combined with the MDEA in the absorbent liquid can vary quite widely. The said amount is advantageously such that the ratio of the number of moles of activator to the total number of moles of activator and MDEA is between 0.01 and 0.5, and preferably ranges from 0.05 to 0.25.

DETAILED DESCRIPTION OF THE INVENTION

According to the invention, the gas to be treated contains $CO_2$ and liquid hydrocarbons, and it may further contain one or more acid gas compounds other than $CO_2$, such as for example $H_2S$. A gas of this type is in particular a natural gas, and the overall level of $CO_2$ and other possible acid gas compounds such as $H_2S$ which it contains may range from a few tenths per cent to a few tens per cent by volume.

The overall liquid hydrocarbon content in the gas to be treated is greater than 14 liters of liquid hydrocarbons per million standard cubic meters ($m^3$ STP) of gas, it being possible, in particular, for the content to be up to 10 $m^3$ or more per million $m^3$ (STP) of gas. The volume of gas expressed in "standard cubic meters" represents the volume of gas calculated in cubic meters under standard temperature and pressure conditions, that is to say 0° C. and 1 atmosphere.

The term liquid hydrocarbons is intended according to the invention to mean all the hydrocarbons present in the gas, which are liquid under the working conditions in which the absorbent liquid is brought into contact with the gas to be treated. The liquid hydrocarbons may, in particular, be paraffin hydrocarbons, aromatic hydrocarbons or naphthenic hydrocarbons, such as those which are usually present in the natural gases extracted from deposits.

As indicated above, the implementation of the process according to the invention includes an absorption step, in which the gas to be treated and the absorbent liquid are brought into contact, preferably in counter-current, in an absorption zone in order to produce a treated gas containing a reduced level of $CO_2$ and other possible acid gas compounds, the level corresponding generally to that of the specifications in force for the gas which is treated, and an absorbent liquid loaded with $CO_2$ and other possible acid gas compounds, and a regeneration step, in which the loaded absorbent liquid is subjected to a regeneration treatment in order to release the $CO_2$ and the other possible acid gas compounds retained by the absorbent liquid and to produce, on the one hand, at least one acid gas fraction rich in $CO_2$ and, on the other hand, at least one regenerated liquid absorbent, which is recycled into the absorption zone.

The absorption zone, in which the gas to be deacidified is brought into contact with the absorbent liquid, is preferably equipped with structured or unstructured packing making it possible to provide a large contact area between the absorbent liquid and the gas. However, the absorption zone may also be equipped with other gas/liquid contact elements, in particular gas/liquid contact plates.

The regeneration of the absorbent liquid loaded with $CO_2$ and other possible acid gas compounds, in particular $H_2S$, is advantageously carried out by pressure reduction, in one or more steps, of at least some of the loaded absorbent liquid, which leads to a substantial saving in the energy to be used for this regeneration.

According to one embodiment of the regeneration, the pressure of all of the loaded absorbent liquid is reduced, in one or more steps, in order to release the majority of the $CO_2$ present in the loaded absorbent liquid, then the reduced-pressure absorbent liquid is subjected to a complementary regeneration by steam stripping, by direct or indirect heating of the absorbent liquid, the absorbent liquid resulting from the complementary regeneration being recycled into the absorption zone and, in particular, into the upper part of the zone. In a variant of this embodiment, only a portion of the reduced-pressure absorbent liquid is subjected to the complementary regeneration by stripping, the absorbent liquid resulting from the complementary regeneration being, as indicated above, recycled into the upper part of the absorption zone, while the portion of the reduced-pressure absorbent liquid not subjected to the complementary regeneration is recycled into the absorption zone at a point in the latter located below the point where the absorbent liquid regenerated by stripping is recycled.

According to another embodiment of the regeneration, a fraction of the loaded absorbent liquid has its pressure reduced in order to release the majority of the $CO_2$ which it contains, while the remaining fraction of the loaded absorbent liquid is subjected directly to regeneration by steam stripping, by direct or indirect heating of the said remaining fraction, the absorbent liquid fraction regenerated by stripping being recycled into the upper part of the absorption zone, while the reduced-pressure absorbent liquid fraction is recycled into the absorption zone below the point where the absorbent liquid regenerated by stripping is recycled.

The loaded absorbent liquid leaving the absorption zone may be subjected to preliminary pressure reduction in order to release the non-acid gases such as the hydrocarbons retained by the absorbent liquid, before the regeneration proper is carried out.

The absorption and regeneration steps of the process according to the invention, which are outlined above, can be carried out in any device which makes it possible to deacidify a gas using a regeneratable absorbent liquid, and in particular in those of the devices which make it possible to at least partially regenerate the loaded absorbent liquid by pressure reduction, and possibly to supplement this regeneration with regeneration by stripping. In particular, devices similar to those outlined in U.S. Pat. No. 3,622,267 and U.S. Pat. No. 4,336,233 are suitable.

The absorption zone, in which the gas to be deacidified is brought into contact with the absorbent liquid, may consist in particular of a column provided with structured or unstructured packing, although other types of columns, for example plate columns, may also be used.

The working conditions for carrying out the aforementioned absorption and regeneration steps, in particular temperature, pressure, gas flow rate and liquid absorbent flow rate, lie within the specified ranges for gas deacidification processes using absorbent liquids based on MDEA.

Thus, the absorption step in which the gas to be treated, which contains $CO_2$, liquid hydrocarbons and possibly one or more acid gas compounds other than $CO_2$, is washed with the absorbent liquid, may be carried out at temperatures of between 10° C. and 100° C., and more particularly between 30° C. and 60° C., and under absolute pressures of between 1.5 and 120 bar. Advantageously, the pressure in the absorption zone is selected within the aforementioned range in such a way that the partial pressure of $CO_2$ in the gas flowing through the said zone has a value equal to or greater than 3 bar absolute.

The regeneration by pressure reduction is also carried out at the temperature of the loaded absorbent liquid whose pressure is to be reduced, the pressures reached after each pressure reduction being less than the pressure of the loaded absorbent liquid drawn from the absorption zone, and decreasing from one pressure reduction to the next when a plurality of successive pressure reductions are carried out. The regeneration by stripping is carried out conventionally by subjecting the absorbent liquid to boiling in a stripping zone maintained upstream at a temperature of between about 80° C. and 150° C. and under a pressure of less than 5 bar absolute, and most often between 1.3 and 2.5 bar absolute. When the regeneration by pressure reduction, in one or more steps, is followed by complementary regeneration by stripping, the pressure of the reduced-pressure absorbent liquid sent to the regeneration by stripping is selected so as to be close to the pressure upstream of the stripping zone.

The invention is illustrated by the following example, given without implying any limitation.

EXAMPLE

Reference tests (tests I to VI) and a test according to the invention (test VII) were carried out for the absorption of $CO_2$ contained in a gas which also contains liquid hydrocarbons, using absorbent liquids consisting of aqueous solutions of MDEA and a reference activator (tests I to VI) or MDEA and an activator according to the invention (test VII).

The activators used in these tests were as follows:

| Reference activators: | |
|---|---|
| Test I: | diethylenetriamine (DETA) |
| Test II: | hexamethylenediamine (HMDA) |
| Test III: | 1,2-diaminocyclohexane (DACH) |
| Test IV: | butylmonoethanolamine (BEA) |
| Test V: | aminoethylpiperidine (AEPD) |
| Test VI: | aminoethylpiperazine (AEPZ) |
| Activator according to the invention: | |
| Test VII: | aminoethylethanolamine (AEEA) |

Activator according to the invention

Test VII: aminoethylethanolamine (AEEA)

In each test, the gas to be treated was washed using the selected absorbent liquid, the procedure being carried out in a column provided at its head with an outlet for the gases, in its upper part with an inlet for the liquids, in its lower part with an inlet for the gases and at the bottom with an outlet for the liquids, the internal space of the column, contained between the said inlets for the liquids and for the gases, having a diameter of 0.2 meter and being provided, over a height of 3.5 meters, with structured packing of the Mellapak® packing type marketed by the Sulzer Company.

Through the column inlet for the gases, a gas containing by volume 20% of $CO_2$ and 80% of methane, was injected with a flow rate of 330 m³ (STP)/h, the gas receiving, where it enters the column, an injection representing 0.33 liter/h of liquid hydrocarbons consisting of a $C_9$ to $C_{13}$ hydrocarbon cut having a density equal to 0.8. g/cm³ Through the liquid inlet of the column, the selected absorbent liquid was introduced with a flow rate of 2.3 m³/h, the absorbent liquid consisting of an aqueous solution containing 3.4 mol/liter of MDEA and 0.6 mol/liter of activator, as well as 60 g/liter of $CO_2$ At the head of the column, a treated gas depleted with respect to $CO_2$ was removed, and at the bottom of the column an absorbent liquid loaded with $CO_2$ was drawn off.

The absolute pressure and the temperature at the head of the column had, in the various tests, values equal respectively to 40 bar and 50° C.

The purified gas leaving the column was analysed by gas chromatography to determine its $CO_2$ content.

The results obtained for the various tests are collated in the following table.

TABLE

| Test | Activator | $CO_2$ in the purified gas (% by volume) |
|---|---|---|
| Reference | | |
| I | DETA | 6.50 |
| II | HMDA | 6.90 |
| III | DACH | 6.95 |
| IV | BEA | 6.75 |
| V | AEPD | 6.75 |
| VI | AEPZ | 6.50 |
| Invention | | |
| VII | AEEA | 3.30 |

Examining the results shown in the above table shows that, when liquid hydrocarbons are present in the gas to be deacidified, the absorbent liquid based on MDEA and the AEEA activator (aminoethylethanolamine) used according to the invention (test VII) absorbs a larger amount of $CO_2$ (15 to 20% increase), under comparable working conditions, than each of the reference absorbent liquids (tests I to VI) based on MDEA and the reference activator which was used.

What is claimed is:

1. A regenerative process for deacidification of a gas to be treated which contains $CO_2$ and liquid hydrocarbons comprising the steps of:

contacting the gas to be treated, in an absorption zone, with an absorbent liquid including methyldiethanolamine (MDEA) and an activator of absorption of $CO_2$ by the amine, thereby producing a treated gas with reduced $CO_2$ content and an absorbent liquid loaded with $CO_2$, subjecting the loaded absorbent liquid to a regeneration treatment to release $CO_2$ which it has bound, to produce 1) at least one acid gas fraction rich in $CO_2$ and 2) at least one regenerated absorbent liquid; and recycling into the absorption zone the at least one regenerated absorbent liquid, wherein the overall liquid hydrocarbon content in the gas to be treated is greater than 14 liters of liquid hydrocarbons per million standard cubic meters of gas, and wherein said activator consists of at least one compound of formula $H_2N-C_nH_{2n}-NH-CH_2-CH_2OH$ in which n represents an integer ranging from 1 to 4.

2. The process according to claim 1, wherein the activator combined with MDEA is selected from compounds of formula $H_2N-C_nH_{2n}-NH-CH_2-CH_2OH$, in which n is an integer equal to 2, 3 or 4.

3. The process according to claim 2, wherein the activator is aminoethylethanolamine.

4. The process according to claim 1, wherein the absorbent liquid is in the form of an aqueous solution of MDEA and the activator.

5. The process according to claim 4, wherein the aqueous solution of MDEA and the activator contains one or more organic solvents of $CO_2$ which are soluble in water.

6. The process according to claim 1, wherein the concentration of MDEA in the absorbent liquid is between 1N and 6N.

7. The process according to claim 1, wherein the amount of activator which is combined with the MDEA in the absorbent liquid is such that the ratio of the number of moles of activator to the total number of moles of activator and MDEA is between 0.01 and 0.5.

8. The process according to claim 1, wherein the gas to be treated contains one or more acid gas compounds other than $CO_2$.

9. The process according to claim 1, wherein the liquid hydrocarbon content in the gas to be treated is between 14 liters and 10 cubic meters of liquid hydrocarbons per million standard cubic meters of gas.

10. The process according to claim 1, wherein the gas to be treated is brought into contact with the absorbent liquid, in the absorption zone, at temperatures between 10° C. and 100° C. and under absolute pressures between 1.5 bar and 120 bar.

11. The process according to claim 10, wherein the pressure in the absorption zone is such that the partial pressure of $CO_2$ in the gas flowing through the said zone is equal to or greater than 3 bar absolute.

12. The process according to claim 1, wherein the absorption zone is provided with structured or unstructured packing.

13. The process according to claim 1, wherein the absorbent liquid loaded with $CO_2$ is regenerated by pressure reduction, in one or more steps, of at least some of the loaded absorbent liquid.

14. The process according to claim 13, wherein the loaded absorbent liquid is regenerated by subjecting all of the loaded absorbent liquid to pressure reduction, in one or more steps, to thereby release most of the $CO_2$ present in the loaded absorbent liquid, then by subjecting the reduced-pressure absorbent liquid to complementary regeneration by steam stripping, by direct or indirect heating of the absorbent liquid, the absorbent liquid resulting from complementary regeneration is recycled into the absorption zone.

15. The process according to claim 14, wherein only a portion of the reduced-pressure absorbent liquid is subjected to the complementary regeneration by stripping, the absorbent liquid resulting from the complementary regeneration being recycled into the upper part of the absorption zone, while a portion of the reduced-pressure absorbent liquid not subjected to the complementary regeneration is recycled into the absorption zone, below the absorbent liquid regenerated by stripping.

16. The process according to claim 1, wherein the loaded absorbent liquid is regenerated by subjecting a fraction of the loaded absorbent liquid to pressure reduction, in one or more steps, to thereby release most of the $CO_2$ which it contains, while the remaining fraction of the loaded absorbent liquid is subjected directly to regeneration by steam stripping, by direct or indirect heating of the said remaining fraction, the absorbent liquid fraction regenerated by stripping being recycled into the upper part of the absorption zone, while the reduced-pressure absorbent liquid fraction is recycled into the absorption zone below the absorbent liquid regenerated by stripping.

17. The process according to claim 5, wherein the organic solvents of $CO_2$ soluble in water are selected from the group consisting of sulpholane, methanol and N-methylpyrrolidone.

18. The process according to claim 1, wherein the concentration of MDEA in the absorbent liquid is between 2.5N and 5N.

19. The process according to claim 1, wherein the amount of activator which is combined with the MDEA in the absorbent liquid is such that the ratio of the number of moles of activator to the total number of moles of activator and MDEA is between 0.05 and 0.25.

20. The process according to claim 8, wherein acid gas compound other than $CO_2$ is $H_2S$.

21. The process according to claim 1, wherein the gas to be treated is brought into contact with the absorbent liquid, in the absorption zone, at temperatures between 30° C. and 60° C. and under absolute pressures between 1.5 bar and 120 bar.

22. A process for deacidifying a gas comprising:
providing the gas which contains $CO_2$ and liquid hydrocarbons;
producing a treated gas from the gas which contains $CO_2$ and liquid hydrocarbons with reduced $CO_2$ content and an absorbent liquid loaded with $CO_2$ by contacting the gas to be treated in an absorption zone with an absorbent liquid that includes methyldiethanolamine (MDEA) and an activator of absorption of $CO_2$ by the amine;
producing at least one acid gas fraction rich in $CO_2$ and at least one regenerated absorbent liquid by subjecting the loaded absorbent liquid to a regeneration step; and
recycling into the absorption zone the at least one regenerated absorbent liquid, wherein the overall liquid hydrocarbon content in the gas to be treated is greater than 14 liters of liquid hydrocarbons per million standard cubic meters of gas, and the activator combined with methyldiethanolamine in the absorbent liquid brought into contact with the gas containing $CO_2$ and liquid hydrocarbons consists of at least one compound of formula $H_2N-C_nH_{2n}-NH-CH_2-CH_2OH$ in which n represents an integer ranging from 1 to 4.

* * * * *